US008510540B2

(12) United States Patent
Oba et al.

(10) Patent No.: US 8,510,540 B2
(45) Date of Patent: Aug. 13, 2013

(54) SYSTEM AND METHOD FOR SETTING SECURITY CONFIGURATION TO A DEVICE

(75) Inventors: Kazutaka Oba, Johns Creek, GA (US); Tomoki Hattori, Duluth, GA (US)

(73) Assignee: Ricoh Company, Ltd., Tokyo (JP)

( * ) Notice: Subject to any disclaimer, the term of this patent is extended or adjusted under 35 U.S.C. 154(b) by 1031 days.

(21) Appl. No.: 12/356,855

(22) Filed: Jan. 21, 2009

(65) Prior Publication Data

US 2010/0186063 A1 Jul. 22, 2010

(51) Int. Cl.
*H04L 29/06* (2006.01)
(52) U.S. Cl.
USPC .................................. 713/1; 713/2; 713/100
(58) Field of Classification Search
USPC ................... 713/1, 2, 100; 726/1; 709/220, 709/221
See application file for complete search history.

(56) References Cited

U.S. PATENT DOCUMENTS

| | | | | |
|---|---|---|---|---|
| 6,859,843 | B1 * | 2/2005 | Sanchez | 709/250 |
| 2003/0037246 | A1 * | 2/2003 | Goodman et al. | 713/191 |
| 2005/0141025 | A1 * | 6/2005 | Hanada | 358/1.15 |
| 2005/0193121 | A1 * | 9/2005 | Yoshimura et al. | 709/227 |
| 2006/0143600 | A1 * | 6/2006 | Cottrell et al. | 717/168 |
| 2006/0200707 | A1 * | 9/2006 | Shishido et al. | 714/100 |
| 2007/0043805 | A1 * | 2/2007 | Izaki et al. | 709/201 |
| 2007/0234354 | A1 | 10/2007 | Hattori | |
| 2007/0245358 | A1 | 10/2007 | Hattori et al. | |
| 2008/0046710 | A1 * | 2/2008 | Maddocks et al. | 713/2 |
| 2009/0083398 | A1 * | 3/2009 | Ford et al. | 709/220 |

FOREIGN PATENT DOCUMENTS

WO    WO 2007132233 A2 * 11/2007

OTHER PUBLICATIONS

Ricoh Americas Corporation, Ricoh ® Aficio MP 7500 Manual, Jun. 11, 2008, http://www.ricoh-usa.com/downloads/downloads.asp?tsn=Ricoh-USA&path=http://support.ricoh.com/bb_v1oi/html/oi/rc2/model/mp55/mp55en.htm.
Ricoh Americas Corporation, Ricoh ® Aficio SP 4100 Manual, Mar. 13, 2007, http://www.ricoh-usa.com/downloads/downloads.asp?tsn=Ricoh-USA&path=http://support.ricoh.com/bb_v1oi/html/oi/rc2/model/sp41/sp41en.htm.
"Back up and Restore Configuration Files," Document ID No. 46741, Cisco Systems, Inc., Aug. 3, 2006.

* cited by examiner

*Primary Examiner* — Kambiz Zand
*Assistant Examiner* — Hilary Branske
(74) *Attorney, Agent, or Firm* — Oblon, Spivak, McClelland, Maier & Neustadt, L.L.P.

(57) ABSTRACT

A method of accessing an image forming apparatus (IFA) or a multifunction printer (MFP) using a management device (MD) via a network, transmitting security information from the MD to the IFA, updating an original security configuration of the IFA with a new security configuration using the security information, using the new security configuration by the IFA, and confirming the new security configuration with the MD. After confirming, it is preferable the security information is deleted. Also, an IFA including a confirmation unit and a write protection unit for use with the method.

20 Claims, 8 Drawing Sheets

SYSTEM AND METHOD FOR SETTING SECURITY CONFIGURATION TO A DEVICE

BACKGROUND OF THE INVENTION

1. Field of the Invention

This invention relates to printing devices, multifunction devices, copiers, image forming apparatuses and document management devices configured in networks with security protocols and/or security configuration requirements for communication.

2. Description of the Related Art

Printing devices and multifunction devices, such as copiers, scanners, multifunction printers, fax machines and other document management devices are commonly used in large network systems. Some large organizations, including corporations and universities, use as many as tens of thousands of such devices in a network configuration.

One method of updating a security configuration in a network is discussed in Document ID No. 46741 updated on Aug. 3, 2006, published by Cisco Systems, Inc. In such a method, a backup of the current security configuration of the device is made using a trivial file transfer protocol (TFTP) or a file transfer protocol (FTP) server. The backup is made by first connecting to the device to be updated and accessing the hardware and software to perform the backup by entering, for example, an administrator login and password to gain access to the device. The security configuration is then transmitted to the TFTP of FTP server for backup.

For restoration of a security configuration, as discussed in Document ID No. 46741, the device is directed to the TFTP or FTP server having thereon recorded the backup of the original security configuration. The device then downloads the original security configuration and restores the original functionality and security settings to the device.

SUMMARY OF THE INVENTION

The invention broadly comprises a method of accessing an image forming apparatus (IFA) or a multifunction printer (MFP) using a management device (MD) via a network, transmitting security information from the MD to the IFA, the security information containing a security module and a new security configuration. The method also includes storing an original security configuration of the IFA in a first storage area of the IFA and storing the new security configuration in a second storage area of the IFA, updating a security setting of the IFA using the new security configuration, and confirming the new security configuration with the MD using the updated security setting. After confirming, it is preferable the security information, which has been transmitted, is deleted from the IFA.

In some aspects, the updating includes changing a security setting, including at least one of a user access list, a privilege list, a password, a port access list, a network service activation, an administrator setting, a traffic filter, a firewall setting, a security key and a security communication protocol of the IFA. In this aspect, it is preferable the new security configuration includes at least one of a user access list, a privilege list, a password, a port access list, a network service activation, an administrator setting, a traffic filter, a firewall setting, a security key and a security communication protocol for the IFA. In other aspects, the accessing the IFA and the transmitting the security information are performed using a security setting contained in the original security configuration of the IFA.

In a further embodiment, the method includes installing the security module onto the IFA and configuring the IFA, using the installed security module, to disable a write protection unit of the IFA before updating the security setting. The write protection unit is configured to inhibit changes to a security setting of the IFA, when enabled. The write protection unit is enabled after the confirming. In this embodiment, it is preferable the method further includes uninstalling the security module from the IFA and deleting the original security configuration from the first storage area if the confirming is successful. This embodiment also includes uninstalling the security module from the IFA, deleting the new security configuration from the second storage area, and updating the security setting using the original security configuration if the confirming is unsuccessful.

In another embodiment, the method includes deleting the original security configuration from the first storage area if the confirming is successful, and deleting the new security configuration and updating the security setting using the original security configuration if the confirming is unsuccessful. In this embodiment, it is preferable the confirming includes transmitting a confirmation request from the IFA to the MD using the updated security setting, and transmitting a confirmation from the MD to the IFA using the updated security setting if the confirmation request is received at the MD. It is even more preferable the deleting the original security configuration is performed after a time delay instruction contained in the confirmation transmitted from the MD to the IFA. In some aspects, the confirming is defined as unsuccessful if the confirmation is not received by the IFA from the MD within a predetermined time period. This predetermined time period is preferably 60 seconds.

The invention also broadly comprises a method of downloading security information to an IFA or an MFP, the security information containing a security module and a new security configuration, and storing an original security configuration of the IFA to a first storage area of the IFA and storing the new security configuration to a second storage area of the IFA. The security module is then installed onto the IFA and the IFA is configured, using the installed security module, to disable a write protection unit of the IFA, the write protection unit being configured to inhibit changes to a security setting of the IFA when the write protection unit is enabled. The method also includes updating a security setting of the IFA using the new security configuration, confirming the new security configuration using the updated security setting, and then enabling the write protection unit after the confirming.

In a further embodiment, the method includes uninstalling the security module from the IFA and deleting the original security configuration from the first storage area if the confirming is successful, and uninstalling the security module from the IFA, deleting the new security configuration from the second storage area, and updating the security setting using the original security configuration if the confirming is unsuccessful. In one aspect, the confirming includes transmitting a confirmation request from the IFA to a networked device using the updated security setting, and transmitting a confirmation from the networked device to the IFA using the updated security setting if the confirmation request is received at the networked device. Preferably, confirming is defined as unsuccessful if the confirmation is not received by the IFA from the networked device within a predetermined time period.

Moreover, the invention also broadly comprises an IFA or an MFP for use in a system for updating a security configuration of the IFA using a MD connected to the IFA via a network. Here, the IFA includes a unit configured to connect to a MD and receive security information from the MD, the security information including a new security configuration, a first storage area configured to record an original security configuration, and a second storage area configured to record the new security configuration. The IFA further includes a communications unit configured to use a security setting contained in the new security configuration, and a confirmation unit configured to confirm the security setting contained in the new security configuration by using the network to connect to the MD, and further configured to configure the communications unit to use a security setting contained in the original security configuration if confirmation is unsuccessful.

In one embodiment, the IFA further includes a write protection unit configured to inhibit changes to a security setting of the IFA when the write protection unit is enabled. In this embodiment, the installation unit is configured to disable the write protection unit if a security module is installed, and the installation unit is configured to enable the write protection unit if a security module is uninstalled.

In some aspects, the confirmation unit is further configured to transmit a confirmation request to the MD using the communications unit and the security setting contained in the new security configuration. Here, the confirmation unit is configured to delete the original security configuration from the first storage area if a confirmation response is received from the MD, and delete the security information including the new security configuration and the security setting and further configure the communications unit to use the security setting contained in the original security configuration if a predetermined time period elapses before a confirmation response is received from the MD.

In other aspects, the IFA further includes an installation unit configured to install a security module contained in the security information and configure the communications unit to use the security setting contained in the new security configuration. In this aspect, it is preferable the confirmation unit is further configured to transmit a confirmation request to the MD using the communications unit and the security setting contained in the new security configuration, delete the original security configuration from the first storage area if a confirmation response is received from the MD, and delete the security information including the new security configuration and the security setting if a predetermined time period elapses before a confirmation response is received from the MD. In addition, the installation unit is further configured to configure the communications unit to use the security setting contained in the original security configuration if the predetermined time period elapses before a confirmation response is received from the MD. It is even more preferably the installation unit is configured to uninstall and delete the security module after a confirmation response is received, and to uninstall and delete the security module after the predetermined time period elapses.

BRIEF DESCRIPTION OF THE SEVERAL VIEWS OF THE DRAWINGS

A more complete appreciation of the invention and many of the attendant advantages thereof will be readily obtained as the same becomes better understood by reference to the following detailed description when considered in connection with the accompanying drawings, wherein.

DETAILED DESCRIPTION OF THE INVENTION

Figure 1:
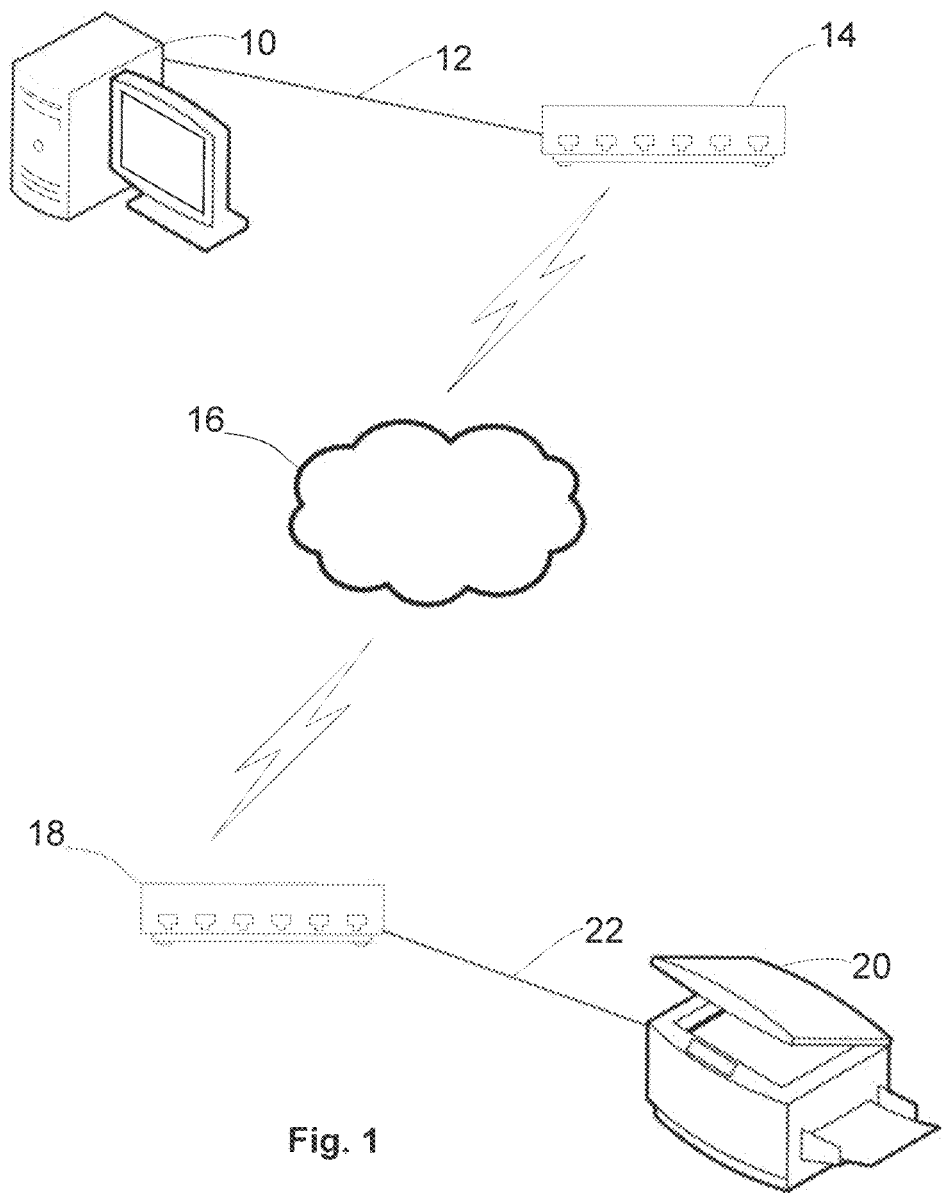
FIG. 1 is a schematic diagram of a management device communicating via a network with an image forming apparatus.

Referring to the drawings, wherein like reference numerals designate identical or corresponding parts throughout the several views, FIG. 1 shows a management device (MD) 10 connected to a security device 14 via a network connection 12. The MD 10 is a work station, such as a personal computer having a keyboard and display. Preferably the MD 10 includes a network adapter, such as an Ethernet adapter or a wireless Ethernet adapter according to one of the IEEE network communication standards. For example, a TCP/IP controller for a 10/100/1000 Mbit/s Ethernet controller in accordance with the IEEE 802.3 LAN protocol, or a network controller in accordance with one of the wireless networking IEEE protocols 802.11b, 802.11g, or 802.11n. The network connection 12, in one embodiment, is a category five (Cat5 or Cat5e) cable in accordance with the IEEE 802.3 protocol although any type of communication protocol or medium can be used, including wired, wireless or optical, for example. Additionally, in other embodiments, IEEE 1284, IEEE 1394, Bluetooth® or USB is used.

Figure 2:
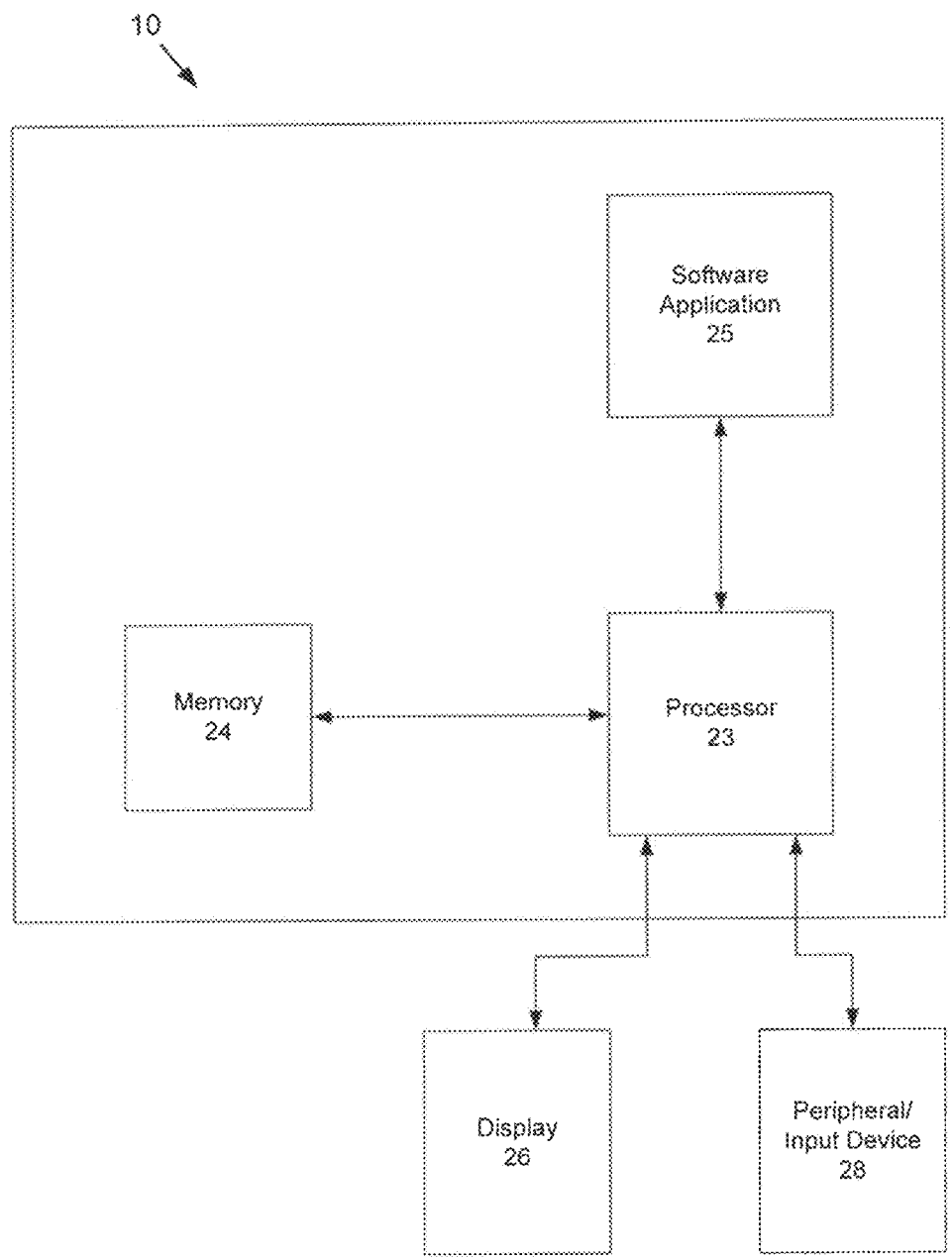
FIG. 2 is a schematic diagram of the management device depicted in FIG. 1.

As shown in FIG. 2, the MD 10 also preferably includes a processor 23 connected to a memory 24 and a software application 25, and configured to connect to a network and an image forming apparatus or multifunction printer as discussed below. The MD 10 also preferably includes a display 26 and peripheral/input devices 28, including but not limited to a keyboard and a mouse. In one embodiment, the MD 10 is a hand held device or a portable device configured for secure internet communications, such as a laptop or notebook computer.

Adverting back to FIG. 1, the security device 14 preferably includes a plurality of Ethernet connection ports and is configured to route information and secure information according to a first protocol or security configuration. The first protocol can include encrypted data such as, for example in a wireless network environment, WPA/WPA2 (IEEE 802.11i) and WEP/WEP2. In a wired network, one embodiment includes encrypting the communication to and from the security device 14.

The security device 14 is preferably configured to route information of any encryption and to create a secure connection via the Internet 16 or the World Wide Web 16 to a security device 18. Communication between the security device 14 and the security device 18 is relegated to a TCP/IP protocol, but in alternative embodiments, communication includes any of FTP, TFTP, DHCP, DNS, HTTP, SMTP, IMAP, TCP, UDP, IPX/SPX, AppleTalk, SMB, NCP, VPN and any other protocol of configuration capable of secure communications. In some aspects, the security device 14 is a network router, but in others the security device 14 is merely a firewall or network switch. In a preferred aspect, the security device 14 is a CISCO 3800 ISR (integrated services router) or similarly functioning device. However, the entirety of features of a CISCO 3800 ISR is not necessary.

The security device 18 is similarly configured to the security device 14. However, it is not necessary for both of the security devices 14 and 18 to be identically configured, the same device or to contain the same hardware. The security device 18 is connected to an image forming apparatus (IFA) 20 via a network connection 22. In a preferred embodiment the image forming apparatus 20 is a multifunction printer (MFP). A multifunction printer is a device which includes two or more office machine features, one of which is commonly a printing feature. The other feature is commonly a scanner, but can include a copier, a facsimile unit, an automated document feeder, a flatbed scanner, a paper tray, a touch-screen display, a network controller, a wireless network controller, a binder, a duplexer, a rasterizer, a stapler, a hole punch, and a document management unit, including email and electronic document management. Generally, a multifunction printer includes at least two of the aforementioned features. In a similar fashion as the MD 10, the IFA 20 includes a network adapter, such as an Ethernet adapter or a wireless Ethernet adapter according to one of the IEEE network communication standards. Any of the protocols or structures used for the network communication line 12 can also be used with the network connection 22, including USB.

Figure 3:
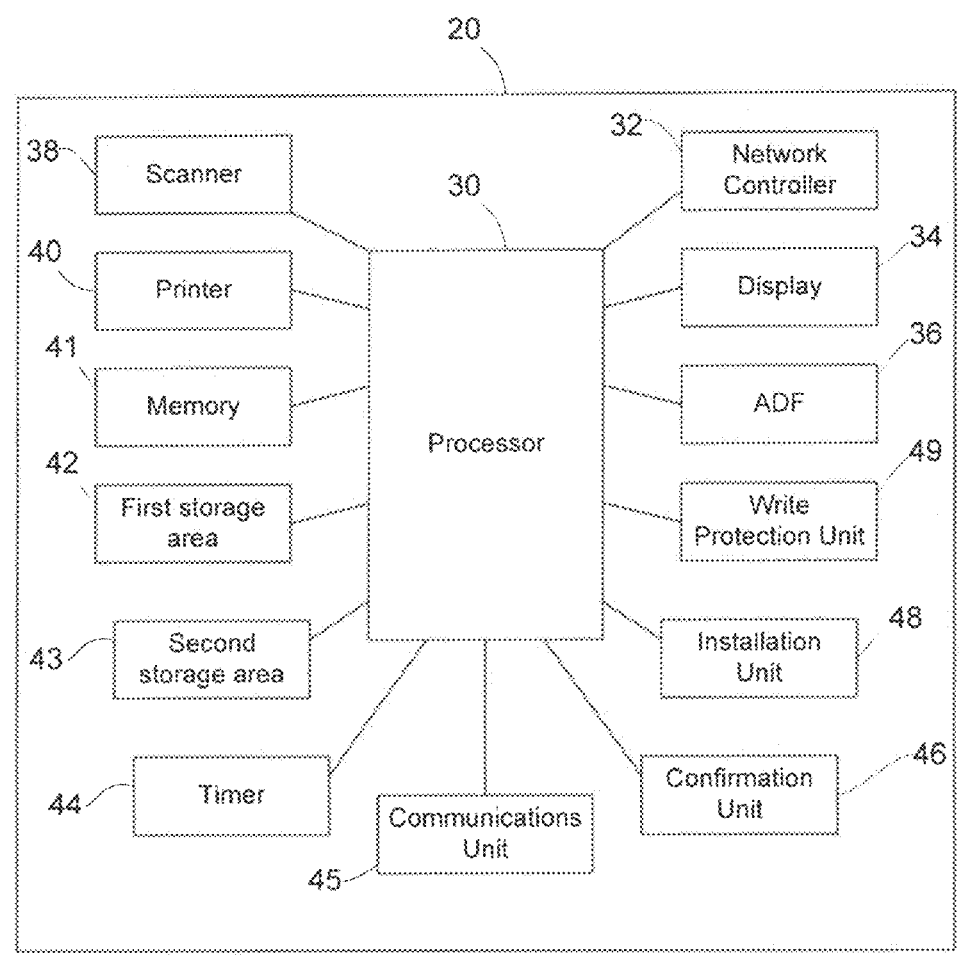
FIG. 3 is a schematic diagram of the image forming apparatus depicted in FIG. 1.

A schematic diagram of the IFA 20 is shown in FIG. 3. The IFA 20 includes a processor 30, a network controller 32, a display 34, an automatic document feeder 36, a scanner 38, a printer 40, a memory 41, a first storage area 42 and a second storage area 43. Optionally, the IFA 20 further includes a timer 44, either as an individual unit connected to the processor 30 or as instructions written on a computer readable medium and processed by the processor 30. The timer 44 can also be digital timer running on a programmed processor. In addition, each of the aforementioned features of the IFA 20 is preferably controlled, accessed or operated via the processor 30.

The first storage area 42 and the second storage area 43 refer to locations on a storage device, such as a non-volatile storage device, for example a hard disk drive or a solid-state device. The storage device, in an alternative embodiment, is a flash memory device. The first and second storage areas 42 and 43 are preferably located on separate storage devices, specifically two separate solid-state storage devices and even more preferably two separate non-volatile flash memory chips. However, depending on the particular configuration of the IFA 20, the first and second storage areas 42 and 43 are located on the same storage device.

In a preferred embodiment, the IFA 20 further includes a communications unit 45 and a confirmation unit 46. The communications unit 45 is configured to use a security setting stored on any of memory 41, first storage area 42 or second storage area 43. The communications unit 45 is configured to operate with processor 30 and network controller 32 in network communication, specifically via the Internet 16 with the MD 10. The confirmation unit 46 is configured to confirm a security setting or a new security configuration used by the communications unit 45, the process of which is discussed below. The confirmation unit 46, in one embodiment, is a programmed processor configured to transmit a confirmation request and receive a confirmation using the communications unit 45. The communications unit 45, in this embodiment, is a programmed processor configured to transmit and received data using the network controller 32. In some aspects, the network controller 32 and the communications unit 45 are implemented on shared electronic circuitry, such as a programmed processor. In other aspects, the confirmation unit 46 is further included on the shared electronic circuitry of the network controller 32 and the communications unit 45. In a further embodiment, the communications unit 45 and the confirmation unit 46 are individual application specific integrated circuits (ASICs) or are both part of the same ASIC.

In further embodiments, the IFA 20 is configured with an installation unit 48 and a write protection unit 49. The installation unit 48 is configured to install a security module, discussed below, onto the IFA 20 using any of memory 41, first storage area 42 or second storage area 43. The security module is a data structure written onto a computer readable medium and includes data and in some aspects program code and installation code for installing the security module onto an IFA 20. Additionally, the installation unit 48 is configured to configure the IFA 20 and preferably the communications unit 45 to use a security setting recorded on any of memory 41, first storage area 42 or second storage area 43 for controlling the transmission or reception of data corresponding to, e.g., any of processor 30, network controller 32, scanner 38 or printer 40. The installation unit 48, in some aspects, is a component of the processor 30 which is arranged to use instructions encoded onto, e.g., the memory 41. In other aspects, the installation unit 48 is a programmed processor separate from the processor 30, and connected thereto using, e.g., a bus. Here, the installation unit 48 can be an ASIC.

The write protection unit 49 is configured to enable the IFA 20 to modify, delete or add a security setting when a security module is installed or used, and to deny access to the security setting or a security configuration when no security module is installed, used or when the security module is uninstalled. In one embodiment, the write protection unit 49 is a programmed processor, and in other embodiments the write protection unit 49 is an ASIC. In some embodiments, the write protection unit 49 and the installation unit 48 are both part of the same ASIC or programmed processor. By using a write protection unit 49, a security module is first installed prior to the IFA 20 allowing changes to be made to a security configuration or setting.

The IFA 20 is preferably a work center class multifunction printer such as one similar to a RICOH® Aficio MP 7500, the manual for which is incorporated herein by reference, although any type of multifunction printer may be used. The Aficio MP 7500 includes an automated document feeder, a processor, a flatbed scanner, a paper tray, a touch-screen display, a facsimile unit, a network controller and a computer readable hard disk drive or solid-state device. The Aficio MP 7500 optionally includes a binder, a duplexer, a rasterizer, a stapler, a hole punch, an access terminal and a wireless network controller.

In an alternative embodiment, the IFA 20 merely includes a processor 30 configured to control a printer 40, a network controller 32, a first storage area 42, a second storage area 43, a communications unit 45, a confirmation unit 46 and an installation unit 48. For example, the IFA 20 in this embodiment is similar to a RICOH® Aficio SP 4100N, the manual for which is incorporated herein by reference.

Figure 4:
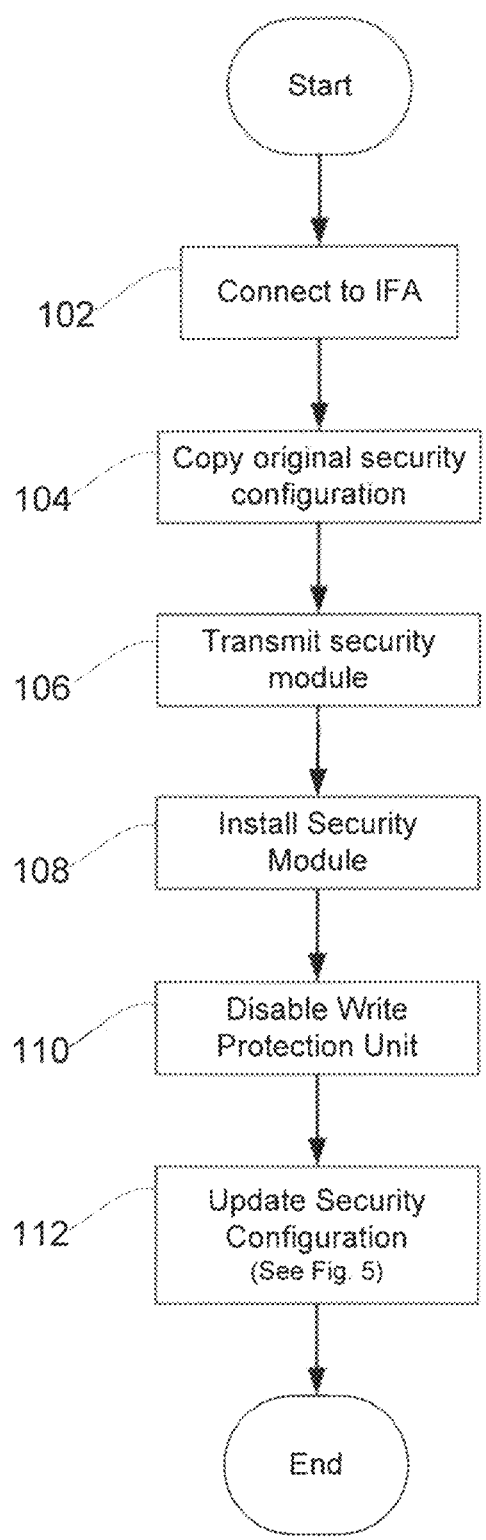
FIG. 4 is a flowchart of a management device connecting to an image forming apparatus for updating a security configuration of the image forming apparatus using a security module.

FIG. 4 illustrates a flowchart of a method according to the invention, using the above configuration where the IFA 20 is accessed by the MD 10 for updating an original security configuration of the IFA 20 with a new security configuration using security information which is transmitted from the MD 10 to the IFA 20 via the Internet 16. At a first step 102, the MD 10 connects to the IFA 20, for example using the network controller 32 and/or the communications unit 45. At step 104, the IFA 20 records a copy of the current/original security configuration or security setting to the first storage area 42.

The MD 10 then transmits security information, preferably including a security module and a new security configuration, at step 106 to IFA 20.

A new security configuration, provided in some aspects by the security information, includes security settings which are variable depending on the functional capabilities of the IFA 20. Namely, the security settings or the contents of the new security configuration will depend on whether, for example, the IFA 20 is configured to fax, email scanned documents, be a document server, or control access to documents, network services, or any other settings ordinary users should not change or are defined by an administrator. In an embodiment where the security information includes a security module, the security module is installed at step 108 using the installation unit 48. After the security module is installed at step 108, it is preferable the write protection unit 49 is disabled at step 110, which allows for updating the security configuration or features of the IFA 20 at step 112, the details of which are shown in FIG. 5.

In an alternative embodiment, the security information is provided to the IFA 20 using a portable device such as a laptop or external storage device, such as a USB memory drive. In this embodiment, the device is connected to IFA 20 via, e.g., a USB cable or connector and the display 34 is used to download the security information, including the security module and the new security configuration onto the IFA 20.

Figure 5:
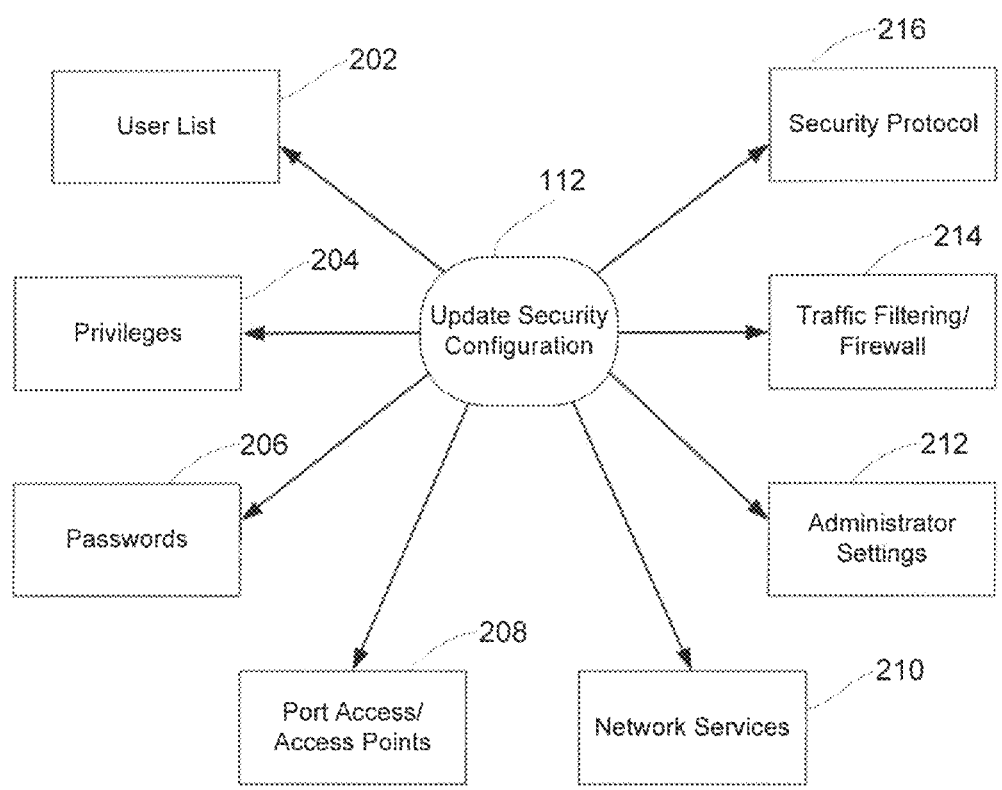
FIG. 5 is a flowchart of the updating the security configuration shown in FIG. 4.

Updating the security configuration at step 112, as illustrated in FIG. 5, includes updating at least one of a user list 202, privileges 204, passwords 206, port access/access points 208, network services 210, administrator settings 212, traffic filtering/firewall settings 214, and a security protocol 216, amongst other security features and related aspects. It should be appreciated this is not intended to be an exhaustive listing. Each of the updated security settings are recorded onto the second storage area 43, so as not to overwrite or tamper with the original security configuration recorded on the first storage area 42. It should also be appreciated the new security configuration need not update each of the aforementioned features.

The security module preferably includes an executable program for installation and updating of the security configuration using the installation unit 48 at step 108. In this embodiment, the IFA 20 is further configured such that the security configuration, and even more preferably a security setting, can only be altered by the executable program included with the security information. In one embodiment, this makes use of disabling the write protection unit 49 at step 110, as previously discussed, which only allows changes to the security settings or configuration if performed by a security module or an executable program contained therewith. This creates a more secure environment by increasing the difficulty to alter the security configuration or a security setting on the IFA 20. Further, once the security configuration has been changed, by optionally deleting the security module or accompanying executable program, the security configuration can not be altered until a new security module or executable program is installed. If the IFA 20 is equipped with a write protection unit 49, then the write protection unit 49 is preferably configured, when enabled, to inhibit changes to the security configuration of the IFA 20 unless a security module or accompanying executable program is first installed, at which point the write protection unit 49 is disabled, specifically at step 110.

In one embodiment, the security module is a JAVA-based computer executable program which is installed onto the IFA 20 using the installation unit 48. JAVA is a computer programming platform. Preferably, the security module is installed onto the IFA 20 using commands from the MD 10 in conjunction with using the communications unit 45 and the installation unit 48 of the IFA 20, which creates an access system for updating the original security configuration or security settings with the new security configuration or security settings.

Figure 6:
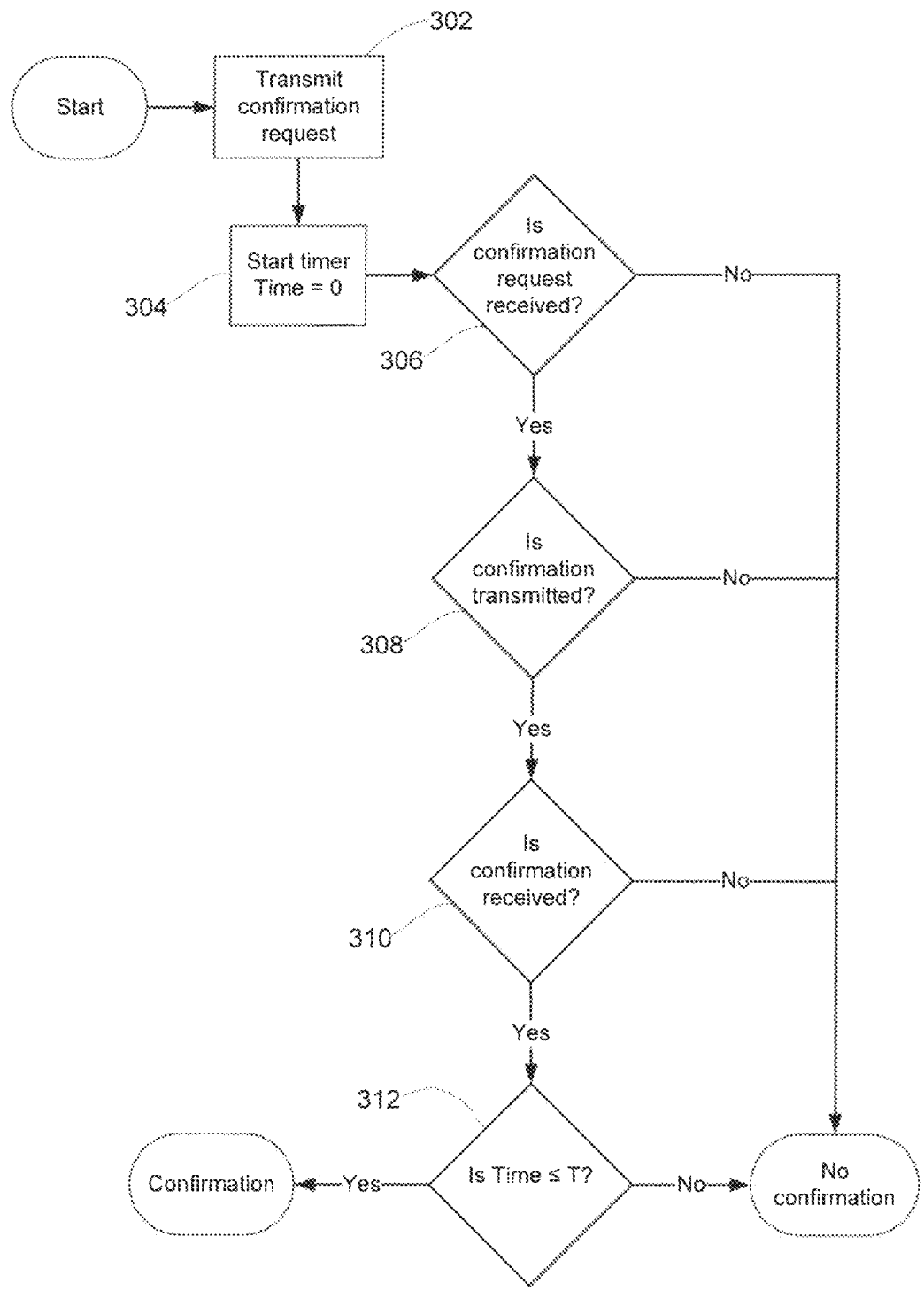
FIG. 6 is a flowchart of confirming a new security configuration.

After the security module has been installed at step 108, the write protection unit 49 has been disabled at step 110, and the security configuration is updated at step 112, the new security configuration is then used by the IFA 20 and the new security configuration is confirmed using the confirmation unit 46 in a process detailed in the flowchart illustrated in FIG. 6. First, a confirmation request is transmitted from the IFA 20 to the MD 10 at step 302, at which point the timer 44 of the IFA 20 is optionally initiated at step 304.

In an alternative embodiment where the security module is downloaded to the IFA 20 from, e.g., a USB drive as discussed above, the IFA 20 transmits a confirmation request to a networked device to test the security configuration and settings. In this embodiment, the MD 10 is one example of such a networked device, but it should be appreciated other networked devices can be used.

Determining whether the confirmation request was sent by the IFA 20 and received at the MD 10, or whether the confirmation was sent by the MD 10 and received at the IFA 20, is simplified by using the timer 44. In this embodiment, the timer 44 is started when the confirmation is sent from the IFA 20, namely at step 304. If a confirmation is not received at the IFA 20 within a predetermined time period T, then the confirmation is presumed unsuccessful.

With further reference to FIG. 6, confirmation is unsuccessful at step 306 if the confirmation request is never received at MD 10 as it results in a confirmation not being transmitted at step 308 by the MD 10 to the IFA 20. If the confirmation is transmitted at step 308, the confirmation must also be received by the IFA 20 at step 310 for confirmation. If each of steps 306, 308 and 310 are performed within the time period T at step 312, then confirmation will be successful—'Yes' in FIG. 7, discussed below. Otherwise, confirmation is unsuccessful—'No' in FIG. 7, also discussed below. Stated alternatively, a confirmation is sent to the MD 10 by the communications unit 45 and the confirmation unit 46 of the IFA 20 while using the new security configuration or security setting. If the new security configuration is successfully used by the IFA 20 and the security setting included with the new security configuration is correct, then the communication link between the IFA 20 and the MD 10 will remain intact and confirmation will be successful. On the other hand, if the communication link between the IFA 20 and the MD 10 is interrupted or no-longer secure, then the new security configuration is not proper, and confirmation will be unsuccessful.

The time period T represents a predetermined time for an expected response. For example, the time delay period T is 60 or 120 seconds, where if confirmation is not received by the confirmation unit 46 of the IFA 20 within 60 or 120 seconds after the confirmation request is transmitted from the IFA 20, then the confirmation unit 46 configures the communications unit 45 of the IFA 20 to use the original security configuration instead of the new security configuration. In one embodiment where the processing of the confirmation takes longer, the delay period is set to several minutes. Alternatively, if the processing is very fast or under ideal network conditions, the delay period is set to several seconds. Other delay periods which are longer or shorter may be used, as desired.

If confirmation is successful, then the new security configuration is used and the old security configuration is either deleted immediately, stored for archival purposes or ensuring proper operation and system restore procedures, or deleted after a set delay. For example, the original security configuration is deleted after two weeks to ensure proper functionality of the IFA 20 using the new security configuration. However, it should be appreciated than any delay period may be used. This process uses the timer 44 for determining the elapsed time.

Figure 7:
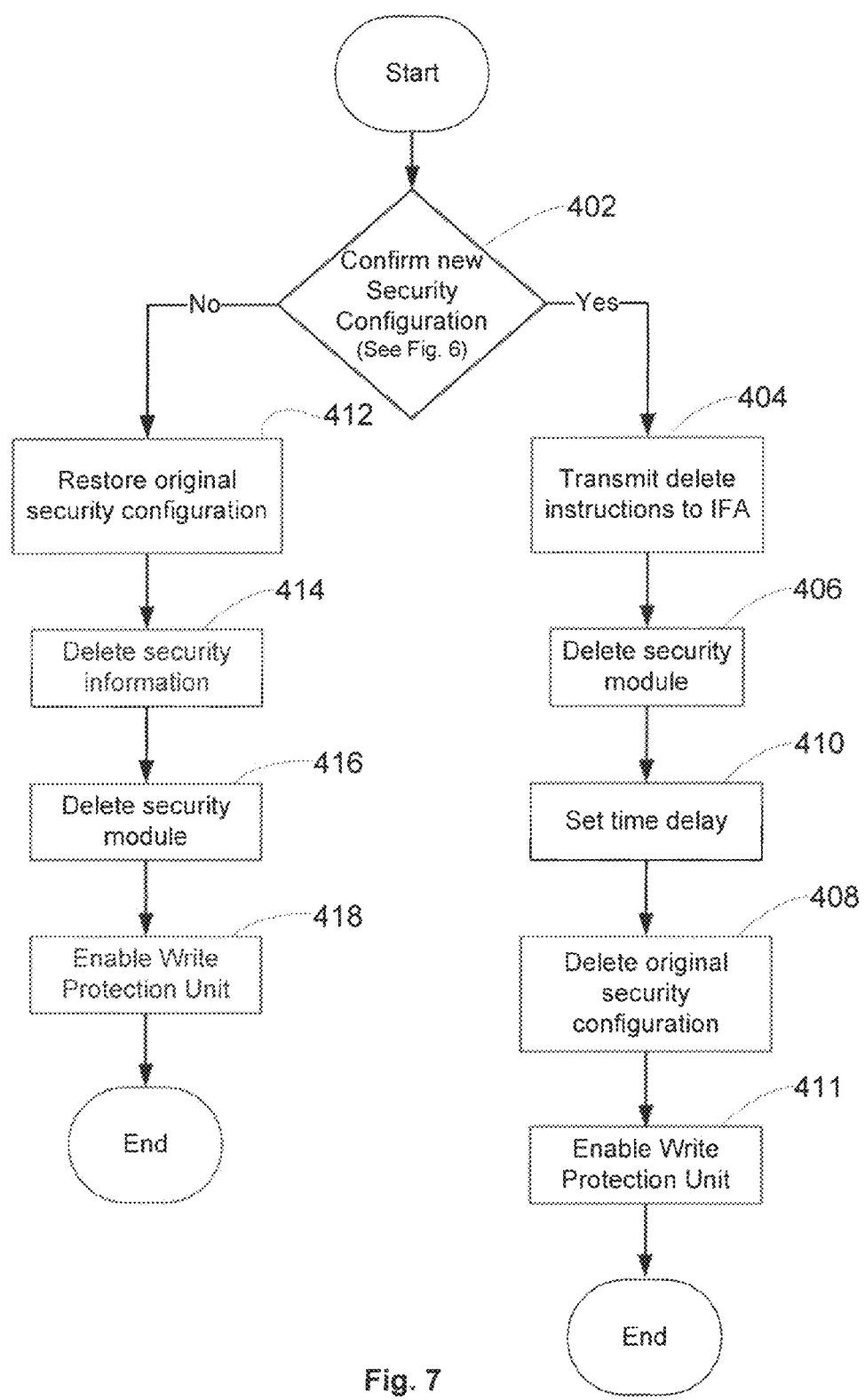
FIG. 7 is a flowchart of further processing of the security module in FIG. 4.

An exemplary process of successful confirmation is depicted in FIG. 7. If confirmation is successful at step 402—'Yes' in the process described with reference to FIG. 6—then the process of updating the security configuration has been successful. If confirmation is successful, then the MD 10 optionally transmits delete instructions to the IFA 20 at step 404 for optionally deleting the security module at step 406 so as to inhibit further changes to the security configuration and further optionally transmits delete instructions for deleting the original security configuration at step 408, including instructions for setting a time delay period at step 410. This preferably includes instructions for the installation unit 48 of the IFA 20 for uninstalling and deleting the security module and any executable program contained therein, as previously discussed. Moreover, the write protection unit 49 is enabled at step 411 to inhibit further changes to the security configuration. Optionally, the step 411 occurs immediately after the security module is deleted or uninstalled at step 406.

In an alternative embodiment, the IFA 20 is further configured to have default settings for delete instructions, including instructions for deleting the new or original security configuration based on confirmation success, deleting the security module, and setting a time delay period. In some aspects, if confirmation of the new security configuration is successful, the original security configuration is deleted from the first storage area 42 by the confirmation unit 46 or the processor 30, the new security configuration is used by the communications unit 45, the processor 30 and the network controller 32 and the security module is uninstalled, the security information transmitted from the MD 10 is deleted by the installation unit 48, and the write protection unit 49 is enabled.

The time delay period at step 410 provides for a balance between security management of old security configurations and efficiency in restoring an old security configuration. A time delay period of two weeks is adequate to test the functionality of many devices and the new security configuration. However, a longer time delay is necessary if the device is not used frequently. In contrast, if it is important to have minimal records of the old security configuration, then the time delay period is set to nil or to a very short time. This is also used in instances where the new security configuration has been previously tested with similar devices and the probability of problematic configurations is slight.

Another exemplary process is depicted in FIG. 7, detailing a process if confirmation is unsuccessful at step 402—'No' in the process described with reference to FIG. 6. Specifically, the original security configuration is restored at step 412 by the confirmation unit 46 such that the communications unit 45 and the IFA 20 are configured to use a security setting in the original security configuration. Optionally, the security information is deleted at step 414 and the security module is uninstalled and deleted at step 416 by the installation unit 48 from the IFA 20. Also optionally, the write protection unit is enabled at step 418 to inhibit any changes to the security configuration until another security module is installed. In some aspects, if confirmation is unsuccessful at step 402, the new security configuration is deleted, the security module is used to restore the contents of the original security configuration, the original security configuration is used, and then the security module is uninstalled and the security information transmitted from the MD 10 is deleted.

Figure 8:
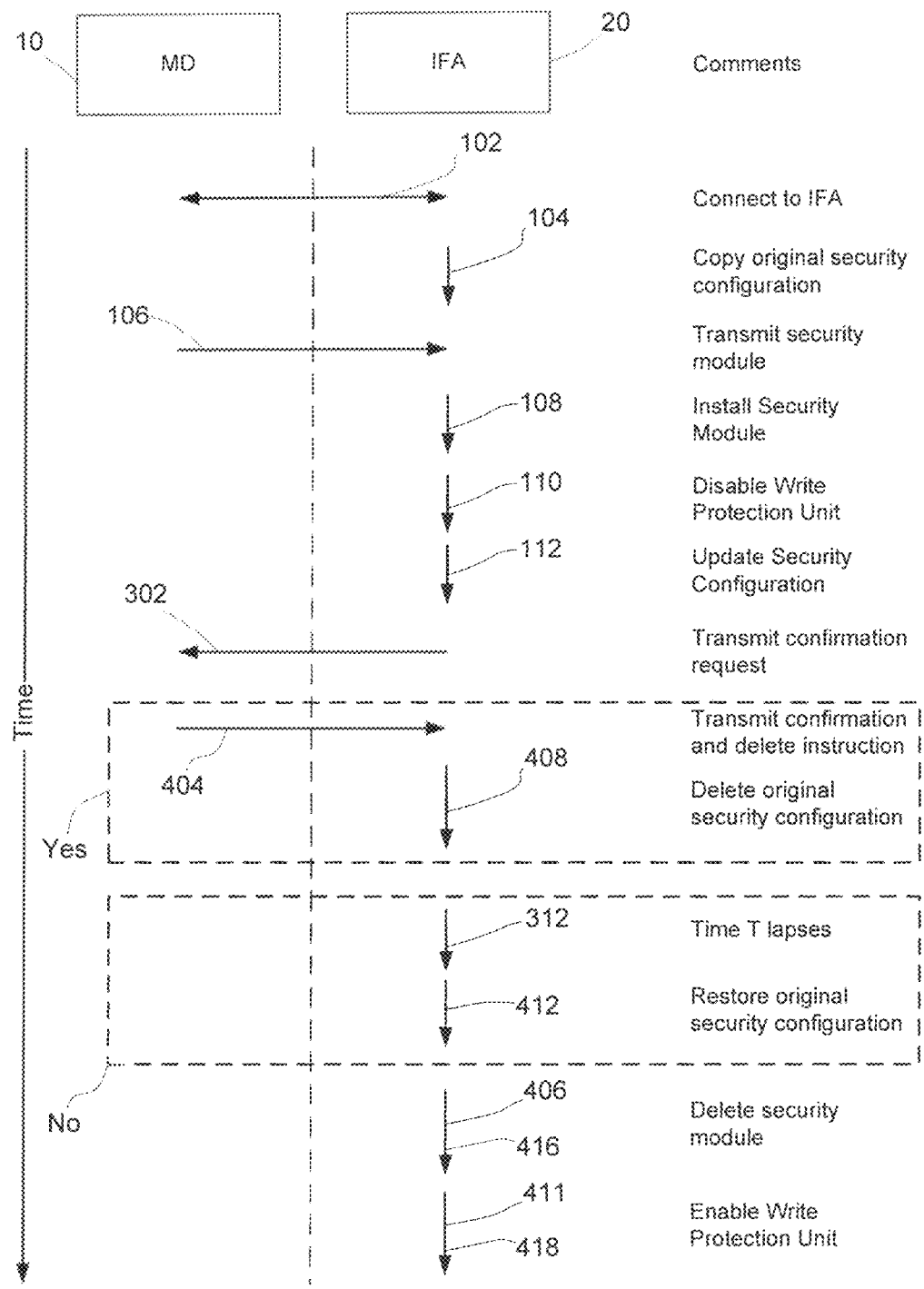
FIG. 8 is a timing diagram of communication between a management device and an image forming apparatus.

FIG. 8 provides further description of the above processes outlined in FIGS. 4-7 in providing a diagram of the timing of communication signals between the MD 10 and the IFA 20. In the diagram, time progresses from the top to the bottom of the page. Step 102 of the MD 10 connecting to the IFA 20 is a bi-directional communication, which includes authentication and preferably includes the exchange of security keys to ensure a secure communication. For example, the IFA 20 prompts an incoming connection from the MD 10 for a password or security file to authenticate a connection from the MD 10.

At step 104, the original security configuration is recorded onto the first storage area and at step 106 the security information or security module is transmitted from the MD 10 to the IFA 20. The security module is installed in the IFA 20 at step 108 and the write protection unit 49 is disabled by the IFA 20 at step 110. Then, the security configuration is updated at step 112 and a confirmation request is transmitted from the IFA 20 to the MD 10 at step 302.

Block 'Yes' identifies a communication flow for a successful confirmation. At step 404 a confirmation is transmitted from the MD 10 to the IFA 20, and at step 408 the original security configuration is deleted.

Block 'No' identifies a communication flow for an unsuccessful confirmation. At step 312 a time period T lapses and confirmation is determined unsuccessful by the IFA 20. At step 412 the original security configuration is restored by the IFA 20.

The security module is then uninstalled and deleted at either of steps 406 or 416 depending on whether confirmation was successful, and lastly, the write protection unit 49 is enabled at either of steps 411 or 418, depending on confirmation success. Thus, it has been shown a reliable process of updating a security configuration for a device where inoperable security configurations automatically result in a default restoration of an original security configuration, obviating a need for a manual reset of a networked device to regain access to the device.

Obviously, numerous modifications and variations of the present invention are possible in light of the above teachings. It is therefore to be understood that within the scope of the appended claims, the invention may be practiced otherwise than as specifically described herein.

We claim:

1. A method, comprising:
    establishing a connection between an image forming apparatus (IFA) and a management device (MD) via a network;
    receiving security information from the MD at the IFA, the security information including a security module and a new security configuration, the security module providing a function to disable and enable a write protection unit of the IFA when the security module is installed onto the IFA;
    installing the security module onto the IFA and configuring the IFA, by the function of the installed security module, to disable the write protection unit of the IFA, the write protection unit being configured to inhibit changes to a security setting of the IFA when enabled;
    storing an original security configuration of the IFA in a first storage area of the IFA and storing the new security configuration in a second storage area of the IFA;
    updating a security setting of the IFA using the new security configuration, after the installed security module has disabled the write protection unit of the IFA;

confirming the new security configuration with the MD using the updated security setting; and enabling the write protection unit, by the function of the installed security module, after the confirming.

2. The method recited in claim 1, further comprising:

after the enabling, in which the installed security module has enabled the write protection unit of the IFA, uninstalling the security module from the IFA and deleting the original security configuration from the first storage area if the confirming is successful; and after the enabling, in which the installed security module has enabled the write protection unit of the IFA, uninstalling the security module from the IFA, deleting the new security configuration from the second storage area, and updating the security setting using the original security configuration if the confirming is unsuccessful, wherein uninstalling the security module from the IFA removes the function to disable and enable the write protection unit of the IFA.

3. The method recited in claim 1, further comprising:

deleting the original security configuration from the first storage area if the confirming is successful; and deleting the new security configuration and updating the security setting using the original security configuration if the confirming is unsuccessful.

4. The method recited in claim 3, the confirming including:

transmitting a confirmation request from the IFA to the MD using the updated security setting; and receiving a confirmation from the MD at the IFA using the updated security setting when the confirmation request is received at the MD.

5. The method recited in claim 4, wherein the deleting the original security configuration is performed after a time delay defined in a time delay instruction contained in the confirmation received from the MD at the IFA.

6. The method recited in claim 4, the confirming being defined as unsuccessful if the confirmation is not received by the IFA from the MD within a predetermined time period.

7. The method recited in claim 4, the confirming further including:

receiving a delete instruction at the IFA from the MD to delete only the security module, and deleting the security module based on the delete instruction, wherein the deleting the original security configuration is performed after a time delay, after the security module is deleted, defined in a time delay instruction contained in the confirmation received from the MD at the IFA, so that the original security configuration is maintained by the IFA for a period after the security module is deleted.

8. The method recited in claim 1, the updating including changing at least one of a user access list, a privilege list, a password, a port access list, a network service activation, an administrator setting, a traffic filter, a firewall setting, a security key and a security communication protocol of the IFA.

9. The method recited in claim 1, wherein the accessing the IFA and the transmitting the security information are performed using a security setting contained in the original security configuration of the IFA.

10. The method recited in claim 1, further comprising deleting the security information, including the security module and the new security configuration, from the IFA.

11. A method, comprising:

downloading security information to an image forming apparatus (IFA), the security information including a security module and a new security configuration, the security module providing a function to disable and enable a write protection unit of the IFA when the security module is installed onto the IFA;

storing an original security configuration of the IFA in a first storage area of the IFA and storing the new security configuration in a second storage area of the IFA;

installing the security module onto the IFA and configuring the IFA, by the function of the installed security module, to disable the write protection unit of the IFA, the write protection unit being configured to inhibit changes to a security setting of the IFA when enabled;

updating a security setting of the IFA using the new security configuration;

confirming the new security configuration using the updated security setting; and enabling the write protection unit after the confirming.

12. The method recited in claim 11, further comprising:

uninstalling the security module from the IFA and deleting the original security configuration from the first storage area if the confirming is successful; and uninstalling the security module from the IFA, deleting the new security configuration from the second storage area, and updating the security setting using the original security configuration if the confirming is unsuccessful, wherein uninstalling the security module from the IFA removes the function to disable and enable the write protection unit of the IFA.

13. The method recited in claim 11, the confirming including:

transmitting a confirmation request from the IFA to a networked device using the updated security setting; and receiving a confirmation from the networked device at the IFA using the updated security setting if the confirmation request is received at the networked device.

14. The method recited in claim 13, the confirming being defined as unsuccessful if the confirmation is not received by the IFA from the networked device within a predetermined time period.

15. The method according to claim 11, wherein the enabling the write protection is performed by the function of the security module, and the method further comprises:

uninstalling the security module from the IFA, after the security module performs the enabling, when the confirming is successful.

16. An image forming apparatus (IFA) for a system for updating a security configuration of the IFA using a management device (MD) connected to the IFA via a network, the IFA comprising:

a unit configured to connect to a MD and receive security information from the MD, the security information including a new security configuration;

a first storage area configured to record an original security configuration;

a second storage area configured to record the new security configuration;

a communications unit configured to use a security setting contained in the new security configuration;

a confirmation unit configured to confirm the security setting contained in the new security configuration by using the network to connect to the MD, and further configured to configure the communications unit to use a security setting contained in the original security configuration if confirmation is unsuccessful;

an installation unit configured to install a security module contained in the security information and configure the communications unit to use the security setting contained in the new security configuration; and a write protection unit configured to inhibit changes to a security setting of the IFA when the write protection unit is enabled, wherein the security module provides a function to disable and enable the write protection unit of the IFA when the security module is installed onto the IFA, the installation unit is configured to, by the function of the security module, disable the write protection unit when the security module is installed, and, by the function of the security module, enable the write protection unit when the confirmation unit confirms the security setting contained in the new security configuration.

17. The IFA recited in claim 16, wherein the confirmation unit is further configured to transmit a confirmation request to the MD using the communications unit and the security setting contained in the new security configuration, delete the original security configuration from the first storage area if a confirmation response is received from the MD, and delete the security information including the new security configuration and the security setting and further configure the communications unit to use the security setting contained in the original security configuration if a predetermined time period elapses before a confirmation response is received from the MD.

18. The IFA recited in claim 16, wherein:

the confirmation unit is further configured to transmit a confirmation request to the MD using the communications unit and the security setting contained in the new security configuration, delete the original security configuration from the first storage area if a confirmation response is received from the MD, and delete the security information including the new security configuration and the security setting if a predetermined time period elapses before a confirmation response is received from the MD, and the installation unit is further configured to configure the communications unit to use the security setting contained in the original security configuration if the predetermined time period elapses before a confirmation response is received from the MD.

19. The IFA recited in claim 18, wherein the installation unit is configured to uninstall and delete the security module after a confirmation response is received by the IFA, and to uninstall and delete the security module after the predetermined time period elapses if the predetermined time period elapses before the confirmation response is received by the IFA.

20. The IFA recited in claim 16, the installation unit is configured to enable the write protection unit if a security module is uninstalled.

* * * * *